US007467542B2

(12) United States Patent
Elrod

(10) Patent No.: US 7,467,542 B2
(45) Date of Patent: *Dec. 23, 2008

(54) ALIGNMENT-TOLERANT LENS STRUCTURES FOR ACOUSTIC FORCE ACTUATION OF CANTILEVERS

(75) Inventor: Scott A. Elrod, La Honda, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 11/237,184

(22) Filed: Sep. 28, 2005

(65) Prior Publication Data

US 2006/0075807 A1    Apr. 13, 2006

(51) Int. Cl.
*G01B 11/30* (2006.01)
(52) U.S. Cl. ......................................................... 73/105
(58) Field of Classification Search ................... 73/105; 250/306, 307
See application file for complete search history.

(56) References Cited

U.S. PATENT DOCUMENTS

| 4,928,316 | A | 5/1990 | Heritage et al. |
| 5,675,075 | A | 10/1997 | Arnold et al. |
| 5,834,644 | A | 11/1998 | Shao et al. |
| 6,990,853 | B2 * | 1/2006 | Elrod ........................... 73/105 |
| 2003/0041657 | A1 | 3/2003 | Degertekin |
| 2003/0041669 | A1 | 3/2003 | Degertekin et al. |
| 2004/0020279 | A1 | 2/2004 | Degertekin |

OTHER PUBLICATIONS

Onaran, A. Guclu, et al., "Actuation of Atomic Force Microscope Cantilevers in Fluids Using Acoustic Radiation Pressure"; IEEE 2002, pp. 356-359.
Friedman, Nir, "Acousto-Optic Scanning System With Very Fast Nonlinear Scans"; Optical Society of America; Optics Letters, vol. 25, No. 24, Dec. 15, 2000, pp. 1762-1764.
Baselt, David, PhD., "Atomic Force Microscopy"; California Institute of Technology, Copyright 1993 by David Baselt, pp. 1-10.
Onaran, A. Guclu, et al., "Tapping Mode and Elasticity Imaging in Liquids Using an Atomic Force Microscope Actuated by Acoustic Radiation Pressure"; Applied Physics Letters, vol. 80, No. 21, May 27, 2002; 2002 American Institute of Physics, pp. 4063-4065.

* cited by examiner

*Primary Examiner*—Robert R Raevis
(74) *Attorney, Agent, or Firm*—Fay Sharpe LLP

(57) ABSTRACT

In accordance with one aspect of the present invention, a cantilever of a probe-based instrument is deflected by directing a beam of ultrasonic acoustic energy at the cantilever to apply acoustic radiation pressure to the cantilever. The energy is generated by an acoustic actuator. The transmitted beam preferably is focused using a cylindrical lens, providing a beam tightly focused in one dimension and unfocused in a second dimension. In accordance with another aspect of the present invention, a power source such as an RF signal generator is operated so as to spread the spectrum of acoustic radiation on a time scale that is short or comparable to the acoustic roundtrip time. Such a design diminishing the resonance effects and sensitivity to spacing between the cantilever and the acoustic source.

20 Claims, 9 Drawing Sheets

ALIGNMENT-TOLERANT LENS STRUCTURES FOR ACOUSTIC FORCE ACTUATION OF CANTILEVERS

This application claims the benefit of U.S. patent application Ser. No. 10/323,384, filed Dec. 18, 2002, the disclosure of which is incorporated herein in its entirety, by reference.

BACKGROUND OF THE INVENTION

The present application is directed to driving systems, and more particularly to a method and apparatus for driving a cantilever through the use of acoustic wave pressure generated by an ultrasonic actuator.

Scanning probe microscopes (SPMs) represent a category of probe-based instruments designed to characterize a surface of a sample at an atomic level, through the monitoring of an interaction between a sample and a tip on a cantilever probe. This interaction is primarily a scanning operation between the tip and sample, whereby data regarding characteristics of the surface is acquired and used to generate an image of the sample region. The image data is commonly acquired via a raster scan of the sample.

A particular type of SPM is known as an atomic force microscope (AFM), which functions by measuring local properties of a sample, such as height, optical absorption, magnetism or other measurable characteristic. The resulting image will resemble an image on a television screen, as it consists of both many rows or lines of information placed one above the other.

AFMs are designed to operate in a variety of modes, including non-contact mode, contact mode and oscillating mode, also known as a tapping mode. In the non-contact mode, the AFM generates a topographic image from measurements based on attractive forces. In this design, the tip does not touch the sample. The non-contact mode does not function effectively in liquids.

In the contact mode of operation, the AFM scans the tip across the surface of the sample, while the force of the tip on the surface of the sample is maintained at a generally constant value. This contact operation is accomplished by moving either the sample or the probe assembly vertically to the surface of the sample upon sensing a deflection of the cantilever as the probe is scanned horizontally across the surface.

In the oscillating mode, the tip is made to oscillate at or near a resonant frequency of the cantilever. The amplitude or phase of this oscillation is kept constant during scanning using feedback signals, which are generated in response to tip-sample interaction. Similar to the contact mode, the feedback signals are then collected, stored and used as data to generate an image of the sample area.

Atomic force microscopes are known to have a resolution down to the atomic level for a wide variety of surfaces. While the general concept of an AFM is similar to that of a record player, as well as the stylus profilometer, to obtain and enable the atomic-scale resolution, AFMs have refinements, including an optical sensor which operates by reflecting a laser beam off of the cantilever. Angular deflection of the cantilever causes an angular deflection of the laser beam. The reflected laser beam strikes a position detector to indicate the position of the laser spot on the detector, and thus the angular deflection of the cantilever.

An area of particular interest in designing an AFM is the mechanism employed to provide an external force to deflect or oscillate the cantilever. In existing AFMs, the cantilever will typically be oscillated by a piezoelectric actuation.

Traditional piezoelectric drives act on the base of the cantilever, not on a free-end portion. Therefore, these systems must apply substantially greater forces to the cantilever to obtain a given deflection magnitude at the free end than would be required if force were applied directly to the free end or the body of the cantilever. Such a design results in certain limitations.

Since a typical AFM cantilever is easily excited to resonance in air, the piezoelectric drive is useful in this environment. However, piezoelectric drives are not very useful in liquid (e.g., water) environments. The reason for this has to do with the quality factor or Q of a resonance of the cantilever. The quality factor, Q, denotes the sharpness of a cantilever's resonance curve. A resonance with a large Q can be excited to relatively large cantilever oscillation amplitudes with relatively small excitation forces. For operation in air or other gaseous environments, the typical piezoelectric drive provides ample excitation force to drive the cantilever to produce a resonance peak that is easily identified and distinguished from parasitic resonance peaks, such as those of the mounts for the cantilever and the piezoelectric drive itself.

Conversely, a cantilever operated in liquids such as water, has a dramatically lower Q, as the liquid dampens the oscillating cantilever. A typical piezoelectric drive does not have enough gain to excite the cantilever sufficiently to produce a resonance peak that is easily located and differentiated from parasitic resonances.

In view of this, specialized cantilever drives have been developed to act along the length of the cantilever rather than only on the base. One such drive is known as a magnetic drive. The typical magnetic drive has a magnetic cantilever that is driven by an electromagnetic force. The cantilever has a fixed base rigidly attached to a support and bears a tip on its free end that interacts with a sample. The cantilever is rendered magnetic by coating one or more of its surfaces with a magnetic layer. By controlling the amplitude of the applied magnetic field, the cantilever can be deflected while the tip interacts with the sample.

However, a magnetic drive has inherent limitations that considerably restrict its range of applications. For instance, it requires a special magnetically-coated cantilever and cannot therefore be used in applications where the cantilever should not be coated with magnetic material. It is also not applicable to situations where the magnetic properties of the sample and/or the environment results in undesirable deflection of the cantilever, producing errors in the measurements. The operating ranges of the magnetic drive system are also limited.

An acoustic drive has also been considered to drive the cantilever. In this design, a cantilever and piezoelectric drive are mounted on a common head in a spaced-apart relationship. The head is mounted above a fluid cell, and the cantilever extends into the fluid cell to interact with the sample in the cell. The piezoelectric drive can be excited by a signal generator to generate acoustic waves that propagate through the glass walls of the fluid cell, through the fluid in the cell, then on to the cantilever, causing the cantilever to oscillate.

Acoustic drives of this type have various disadvantages. For instance, the unfocused acoustic energy will impinge on many other components of the system, such as mounts for the cantilever and the piezoelectric drive, the fluid cell, and even the fluid, exciting resonances in those components. These resonances can be difficult to distinguish from the cantilever resonance. The acoustic drive also has sufficient actuation force at a limited selection of operation frequencies and can be a challenge to match the cantilever resonance with the operation frequency of the acoustic actuator. If a user selects a resonance that does not overlap with the cantilever resonance, the measurements may be unstable.

Pending application U.S. Ser. No. 10/456,136 (Publication No. US 2004-0020279 A1, entitled "Method and Apparatus for the Ultrasonic Actuation of the Cantilever of a Probe-Based Instrument"; U.S. Pat. No. 6,779,387 (U.S. Ser. No. 10/095,850 (Publication No. US 2003-0041657A1)), entitled "Method and Apparatus for the Ultrasonic Actuation of the Cantilever of a Probe-Based Instrument"; and U.S. Pat. No. 6,694,817 (U.S. Ser. No. 10/096,367 (Publication No. US2003-0041669A1)), entitled "Method and Apparatus for the Ultrasonic Actuation of the Cantilever of a Probe-Based Instrument", (all claiming priority to provisional patent application Ser. No. 60/313,911, filed Aug. 21, 2001) (commonly assigned) (all hereby incorporated by reference), describes an ultrasonic force microscope (UFM) intended to have an actuator that drives a cantilever to produce a "clean" frequency response, preferably by driving the cantilever body, rather than the base. It is stated that by driving the body of the cantilever with an ultrasonic actuator, a much higher localized force can be achieved through the use of a traditional piezoelectric actuator. The beam used for actuation is preferably shaped, i.e., manipulated to limit unwanted propagation and directions other than toward the cantilever, so that ultrasonic energy impinges at least primarily on the cantilever.

Two suitable techniques for shaping the beam are listed as focusing and collimation. The ultrasonic small diameter beams can be focused on the cantilever using a Fresnel lens or other focusing device located between the ultrasonic actuator and the cantilever. It is noted that the Fresnel lens may focus the ultrasonic beam to a diameter of approximately 5 µm to 10 µm at a focal distance of 360 µm, where the 5 µm diameter is even smaller than the 8 µm to 12 µm diameter of most laser beams. As a result, it is stated the lens can be used to apply a pinpoint force to the free end of the cantilever or any other point of interest along the length of the cantilever.

It is also proposed that in an alternative embodiment, the beam may be intentionally sized larger than the cantilever to account for tolerances in alignment of the cantilever and the ultrasonic actuator. If, for example, the cantilever is 50 microns wide, and can be reproducibly aligned within ±100 microns, an ultrasonic actuator with a beam width of 250-300 µm in the region of the cantilever could guarantee that a portion of the ultrasonic beam would always strike the cantilever.

Thus, in the incorporated applications, the preferred embodiment purports to disclose an apparatus and procedure for providing pinpoint actuation energy to a cantilever. It is also acknowledged that alignment errors may exist between the cantilever and actuator, whereby the pinpoint accuracy may result in the acoustic beam not impacting the cantilever.

Misalignment of a probe may occur during manufacture or when the cantilever probe is replaced. Particularly, it is known that in operation, the tip carried on the cantilever becomes damaged or worn and will require replacement. Normally, the cantilever and tip come as a single unit, and the entire unit is replaced with a new cantilever/tip arrangement. This replacement operation is a mechanical operation, and a degree of imprecision in the alignment procedure exists. Therefore, when the cantilever/tip arrangement is inserted, and a focused pinpoint (i.e., small diameter) beam is used, misalignment may result in improper interaction between the actuator and the cantilever. To address this issue it is proposed that the beam (i.e., the diameter) is enlarged.

From the foregoing, it can be seen there are concerns related to use of a pinpoint acoustic beam due to misalignment issues. A further issue, however, is that widening the beam to address misalignment causes an increase in undesirable reflections and resonance between the acoustic source and the cantilever. These resonances can result in strong variations in the acoustic force delivered to the cantilever as the resonance conditions vary with variations in spacing between the cantilever and acoustic source.

BRIEF DESCRIPTION OF THE INVENTION

In accordance with one aspect of the present invention, a cantilever of a probe-based instrument is deflected by directing a beam of ultrasonic acoustic energy at the cantilever to apply acoustic radiation pressure to the cantilever. The energy is generated by an acoustic actuator. The transmitted beam preferably is focused using a cylindrical lens, providing a beam tightly focused in one dimension and unfocused in a second dimension. In accordance with another aspect of the present invention, a power source such as an RF signal generator is operated so as to spread the spectrum of acoustic radiation on a time scale that is short or comparable to the acoustic roundtrip time. Such a design diminishes the resonance effects sensitivity to spacing between the cantilever and the acoustic source.

DETAILED DESCRIPTION OF THE PREFERRED EMBODIMENT

Figure 1:
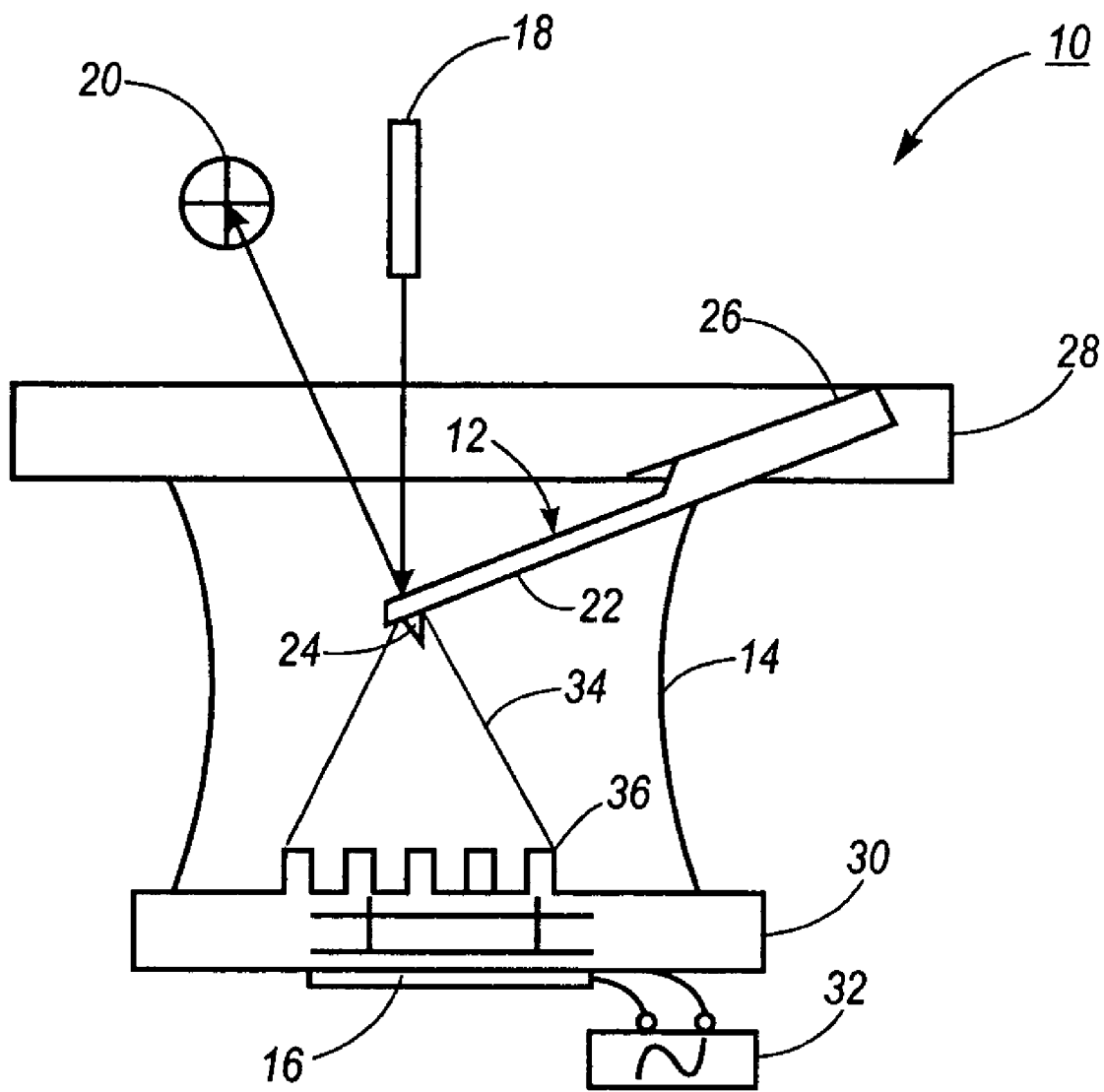
FIG. 1 schematically illustrates an acoustic ultrasonically actuated AFM constructed in accordance with a concept of the present invention.

Referring to FIG. 1, an AFM 10 which incorporates a cantilever deflecting system according to the present application is illustrated. The AFM 10 includes a probe 12 configured to operate in a liquid contained within a cell 14, an ultrasonic actuator 16 for generating acoustic waves, and a detector system (18, 20). Probe 12 includes a cantilever 22 and a tip 24 mounted or otherwise provided on a free end of the cantilever 22. The cantilever, in one embodiment, is made of silicon and may have any of among a number of spring constants and corresponding fundamental resonances. In one example, a cantilever having a spring constant of 0.148 N/m will have a fundamental resonance around 4.6 kHz in water.

The base of the cantilever 22 is fixed to an optically transparent probe support 26, which may fit into a commercial AFM scanhead 28. The fluid cell 14 is positioned beneath the scanhead 28 with the probe 12 closely located. An ultrasonically transparent substrate 30, preferably made of a hard substrate like glass or silicon, is placed below the probe 12 and supports fluid cell 14. The ultrasonic actuator 16, which is preferably formed from a zinc oxide (ZnO) transducer, is mounted on the bottom of the substrate 30, although other materials which will generate the appropriate output may also be used. Alternatively, the ultrasonic actuator can be placed on the side of the substrate directly facing the cantilever. The ultrasonic transducer can then be shaped as a focusing device and electrically isolated from the fluid environment, removing the need for an ultrasonically transparent substrate.

The ultrasonic actuator 16 is driven by a RF signal generator 32 to generate a beam 34, focused by a lens 36 that deflects the cantilever 22 away from the substrate 30. The RF signal generator 32 has an optional modulation input that allows the amplitude of the RF signal to be varied with time. The modulation signal may be a square wave, a sinusoidal wave, a triangle wave or an arbitrary time-varying modulation. The RF signal generator also has an input or an internal adjustment that allows control over the baseline (unmodulated) power of the RF signal.

The scanhead 28 may include an XY actuator and a Z actuator to permit the probe 12 to scan a sample (not shown) in the fluid cell 14. Alternatively, the scanhead 28 could be stationary, and the substrate 30 could be driven to scan relative to the scanhead 28.

Detector system 18, 20 detects cantilever deflection during scanning. The detector system includes a laser 18 positioned above cantilever 22 and a photodetector system 20 configured to receive laser light reflected from the upper surface of the cantilever 22. As is conventional, signals from the photodetector 20 can be used as feedback to control operation of the RF signal generator 32 to maintain a desired characteristic of cantilever deflection, such as magnitude, and/or phase during scanning.

It is known that a plane target placed in the path of an acoustic wave beam in an unconfined medium experiences a time averaged force per unit area. This pressure is known as the "Langevin acoustic radiation pressure" (ARP). Forces imposed by the application of this pressure are used to deflect the cantilever of the probe-based-instrument, such as probe 12. The ARP is related to the average energy density, U, at the target surface. As a simple model based on plane waves, it can be assumed that, at the focal plane, a time harmonic acoustic pressure wave of amplitude, Pi, is normally incident on a cantilever immersed in a liquid and that the wave is reflected with a complex pressure reflection coefficient, Γ. This reflection coefficient can be considered as a weighted average over the incident spectrum of plane waves that would be included in a focused beam. In this case, the time-averaged energy density at the cantilever surface will be given by $$U = \frac{P_i^2}{2\rho c^2}(2|\Gamma|^2) \qquad \text{Equation (1)}$$

where ρ is the bulk density of fluid, c is the speed of sound in the liquid and Γ denotes the absolute value of the reflection coefficient. Using the relation that the average intensity of the incident beam is given by $I_i = P_i^2/(2\rho c)$, the Langevin radiation pressure on the cantilever 22, Ω, can be expressed in terms of the intensity as $$\Omega = \frac{I_i}{c}(2|\Gamma|^2) \qquad \text{Equation (2)}$$

The total force applied to the cantilever in the direction of propagation of the incident waves can be found by integrating the radiation pressure. Accordingly, the total applied force is proportional to the average power incident on the cantilever 22. Note that the discussion above neglects the absorption of the ultrasonic energy in the beam and in the fluid medium. In case of absorption in the fluid medium, acoustic streaming can be induced. The fluid flow induced by this mechanism can generate additional forces on the cantilever. The losses in the cantilever are generally very small and hence can be neglected. Also note that Equations 1 and 2 apply to cantilever actuation applications in air. Since the velocity of sound in air is approximately 330 m/s and Γ~I, the same amount of force can be applied to the cantilever with $\frac{1}{5}^{th}$ of the acoustic power.

Figure 2A:
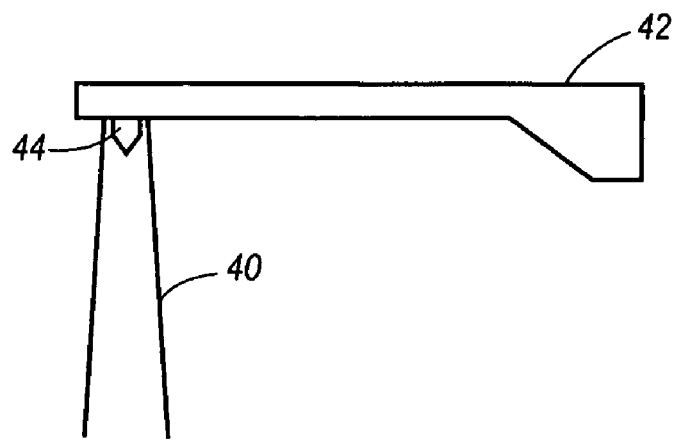
FIG. 2A is a side view of a cantilever and acoustic wave interaction.
Figure 2B:
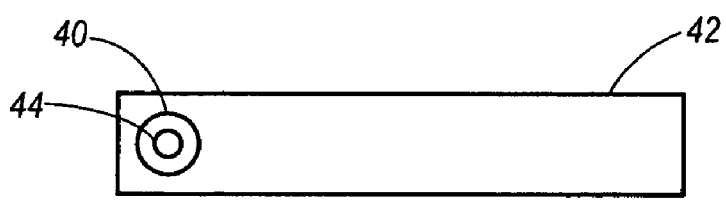
FIG. 2B is a bottom view of FIG. 2A.
Figure 2C:
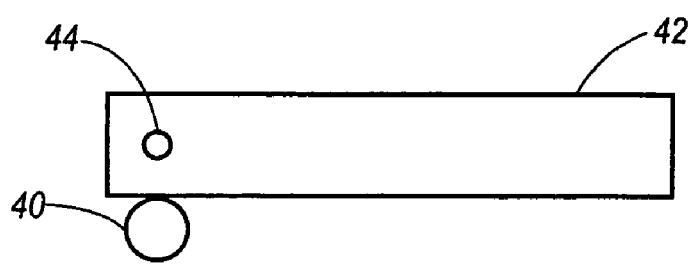
FIG. 2C depicts a misalignment between the cantilever and acoustic wave.

As previously mentioned, and now more particularly illustrated in FIGS. 2A and 2B, in existing systems a focused acoustic beam 40 may be generated with an extremely small diameter by use of a circular Fresnel lens to provide a pinpoint beam or spot on a free end of cantilever 42 (i.e., such as near a tip 44). When alignment is proper, sufficient energy is imparted to deflect the cantilever in an appropriate manner. However, as shown in FIG. 2C, when misalignment exists, acoustic beam 40 does not impart its energy to the cantilever 42.

Figure 3A:
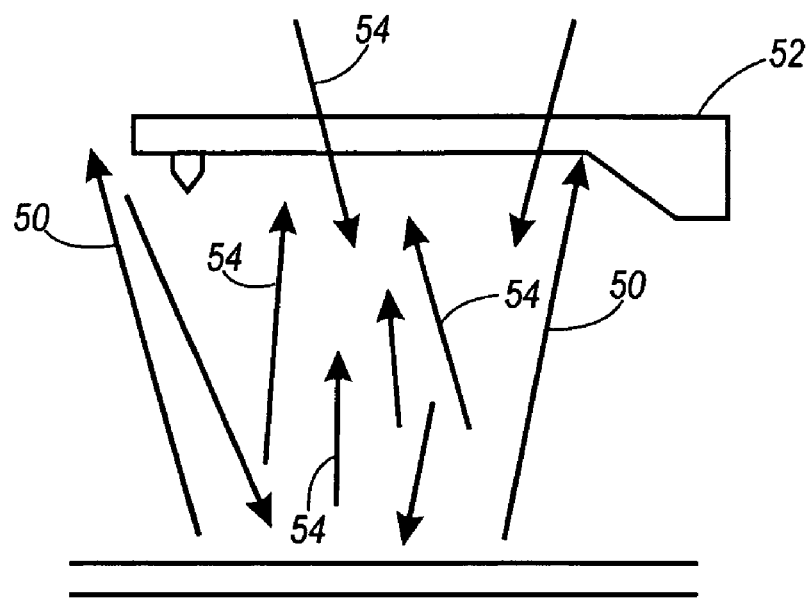
FIG. 3A depicts an enlarged acoustic beam impinging energy to a cantilever.
Figure 3B:
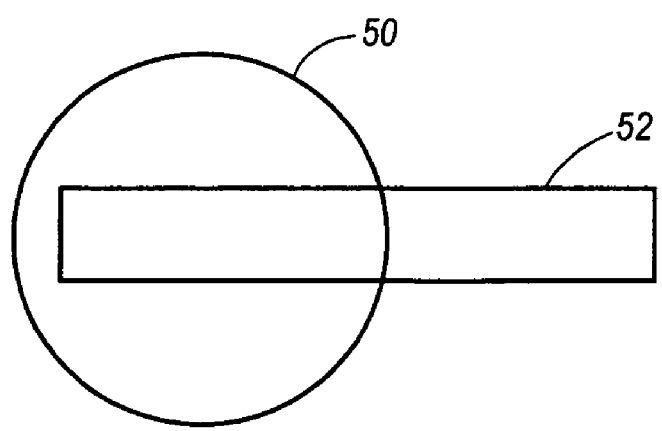
FIG. 3B depicts a bottom view of FIG. 3A.

An alternative operation to avoid this issue is to widen the beam, such as for example shown in FIGS. 3A and 3B. However, an issue created by this alternative is that while acoustic beam 50 imparts energy to cantilever 52, it will also generate undesirable reflected acoustic signals 54 which can cause strongly varying forces on the cantilever for very small changes in the spacing between the cantilever and acoustic source.

Figure 4:
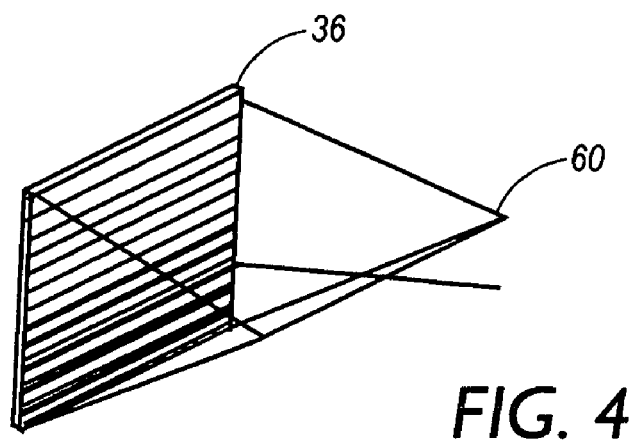
FIG. 4 schematically illustrates a beam produced by a cylindrical or linear Fresnel lens.

To address these issues, in one embodiment, lens 36 of FIG. 1 is a cylindrical lens, such as a Fresnel lens comprised of linear segments, micro-machined into the surface of substrate 30. Lens 36 of this embodiment, as shown in FIG. 4, generates a linear beam 60 (shown in other view as beam 34) tightly focused in one dimension and unfocused in another. As a result, lens 36 applies a force to the free end of the cantilever 22 or any other area of interest along the length of the cantilever 22. Of course, the focal length of lens 36 can be varied to accommodate any physical design constraints to place the actuator further or closer from the cantilever.

Figure 5A:
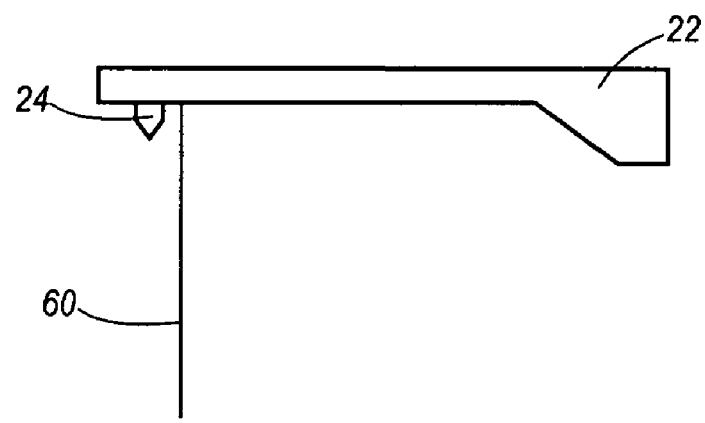
FIG. 5A is a side view of a cantilever and acoustic beam generated by a cylindrical lens of FIG. 4.
Figure 5B:
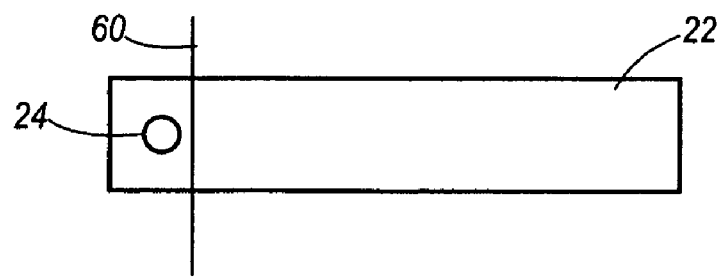
FIG. 5B is a bottom view of FIG. 5A.

By implementing a cylindrical lens with AFM 10, it is ensured, as illustrated in FIGS. 5A and 5B, that the linear acoustic beam impinges upon the cantilever, while at the same time minimizing the undesirable reflective interferences caused by extraneous waves. The length of linear beam 60 is preferably a length equivalent to the width of the cantilever 62 plus a distance 64 extending from the edges of the cantilever 66 to account for mechanical misalignment tolerances. Specific values of the typical mechanical misalignment will vary in accordance with a particular probe design, and may be obtained from a manufacturer. By sizing the linear beam in this way, a consistent force is imparted to the cantilever, even when misaligned.

While some of wave energy from the linear beam towards the cylindrical lens, providing a degree of undesirable buildup of standing waves due to multiple reflections, most of incident energy falls outside of the cantilever, and is dispersed so as to minimize reflective buildup. Also, diffraction losses are greater in such a focused system, and round-trip acoustic reflections will result in smaller resonances than for an unfocused plane wave illumination.

It is appreciated that while the implementation of a cylindrical lens greatly reduces undesirable reflection, some resonances due to reflected waves will still exist.

Particularly, it is understood that typically the roundtrip propagation time for the return of the reflected radiation to cantilever is shorter than the duration of the very narrow band (i.e., single frequency) RF tone bursts that are used for driving the actuator, so the reflected and the non-reflected radiation incident on the cantilever coherently interfere. This interference may be constructive or destructive, and the resonance conditions change as the spacing between the cantilever and acoustic source varies by as little as one quarter acoustic wavelength. These resonances will result in strongly varying acoustic pressure on the cantilever for small changes in the spacing between the cantilever and acoustic source.

In accordance with the present embodiment, provision is made for significantly reducing the effect of resonances on the acoustic power density of the acoustic beam or beams that are incident on the cantilever, which thereby reduce the accuracy of the detected readings. Approaches to accomplish this employ multi-frequency and/or employ frequency RF voltage pulses for driving the actuation so that the acoustic power perturbations caused by the resonances and anti-resonances of the different frequencies tend to neutralize each other.

A first approach to diminish the effects of undesirable reflectance is to drive the actuator with multifrequency RF tone bursts, such that the power perturbations caused by the resonances of one frequency component substantially offset or neutralize the perturbations caused by the anti-resonances of another frequency component, and vice-versa. More particularly, referring to the dual tone driver 70 illustrated in FIG. 6, it will be understood that if the resonances of the lens substrate 30 and of the transducer 16 are ignored, a cantilever location level at which one frequency, $f_1$, is resonant in the fluid arid another frequency $f_2$, is anti-resonant can be determined as a function of the displacement, $l_i$, of the cantilever from the central portion of the lens surface (i.e., the "acoustical center" of the lens 36).

If applied together to the acoustic source, the power perturbations caused by the resonances and anti-resonances of f1 and f2 will tend to neutralize each other, thereby reducing the inaccuracies of the detected deflection values.

Figure 7:
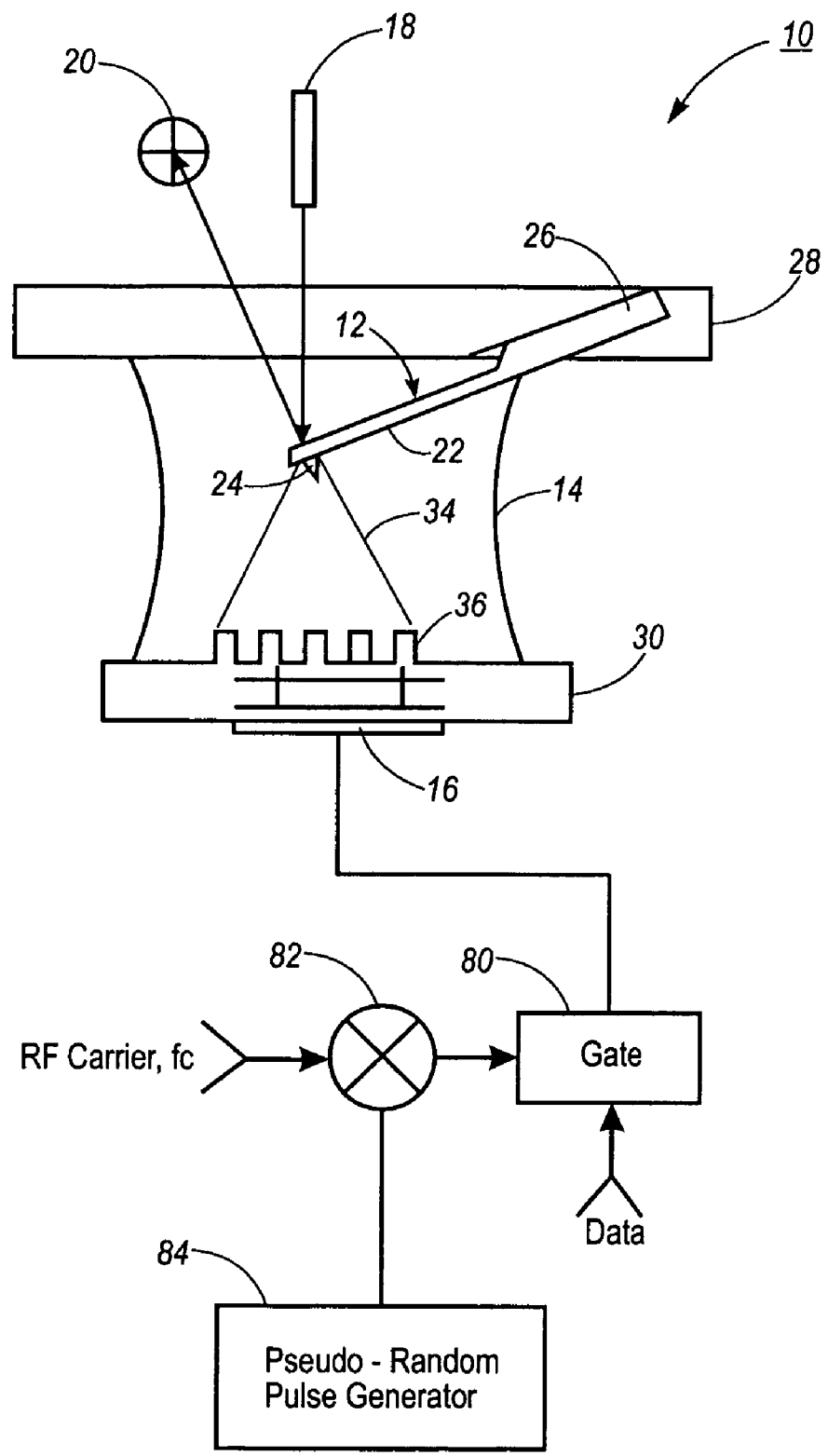
FIG. 7 is a sectional view of an acoustic actuator driven by multi-frequency RF pulses to suppress half-wave resonances.

Alternatively, or in addition, the frequency content of the RF drive pulses may be increased. For example, as shown in FIG. 7, a mixer 80 may be employed for mixing an RF carrier, such as a 150 MHz carrier, with a cyclical pseudo-random bit sequence signal having a frequency of about 20 MHz, such that the drive pulses that are applied to the transducer 16 by a switch or modulator 82 are composed of a large number of RF frequencies ranging from about 130 MHz to about 170 MHz. Suitably, the pseudo-random bit sequence signal is supplied by a pseudo-random bit generator 84 which cycles at the data rate of the activator (i.e., the rate at which data bits are applied to the modulator 82), thereby ensuring that the RF power of the drive pulses applied to the transducer 16 is substantially uniform. It is understood the provided values are simply used for illustration, and the specific values will be dependent on a particular implementation.

Alternatively, a linear chirp signal could be employed to modulate the RF carrier frequency, this embodiment is desirably implemented with the carrier frequency modulated at a high rate. Still another alternative is to employ data modulated, essentially "white" RF noise, for driving the transducer 16.

Figure 6:
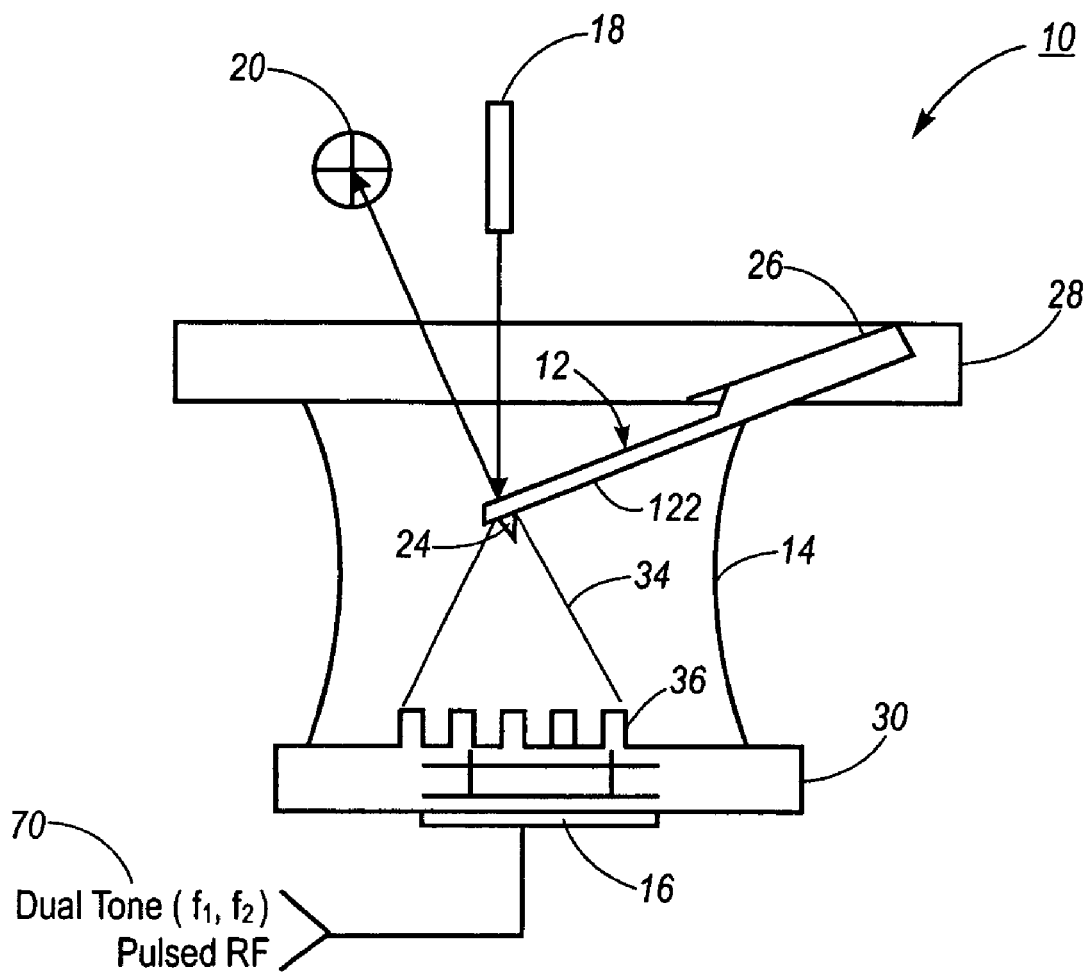
FIG. 6 is a sectional view of an acoustic actuator system according to FIG. 1, driven by a dual frequency RF pulse generator to suppress half-wave resonances in accordance with one aspect of the present application.

In the dual tone embodiment of FIG. 6, the amplitudes of the two frequency components, $f_1$ and $f_2$, can be scaled as required to ensure that their resonances and anti-resonances substantially equally and oppositely perturb the acoustic power at the cantilever. However, when a broad or spread spectrum RF source is employed, such as in FIG. 7, it is simpler to design the source so that it has a relatively flat amplitude across its entire frequency spectrum.

By implementation of these reduction techniques, undesirable reflections of FIGS. 5A, 5B are further reduced. Also, by implementing these techniques, a beam which encompasses, i.e., more fully covers and extends over the cantilever (or fully covers and extends over the cantilever, e.g., FIGS. 3A, 3B), may be used, as the reflectance signals will be substantially neutralized.

As is apparent from the above discussion, the force imposed by the transducer 16 is unidirectional. As a result, ultrasonic beam 34 cannot pull the cantilever 22 in the propagation direction. If it is desired to configure the AFM 10 to selectively pull the cantilever 22 toward the substrate 30 rather than push it away from the substrate, the cantilever 22 could be manufactured with a bias that maintains it in contact with the substrate 30 in the absence of a drive signal to the RF signal generator 32. The RF signal generator 32 could then be driven to overcome the bias and push the cantilever 22 from the substrate 30. The drive voltage could then be reduced to permit the cantilever 22 to move towards the substrate 30, hence, in effect, pulling the cantilever 22 towards the substrate 30. Alternatively, in some configurations, an ultrasonic actuator could be placed both above and/or below the cantilever to push from one or both sides.

The previous discussion demonstrates a particular capability of the current concepts. The ultrasonic cantilever actuator with a cylindrical lens can independently control both the DC and AC forces applied to the cantilever over an extremely wide bandwidth. This opens up a range of applications for this actuator. One example is an imaging method called Force Modulation. In this method, an AFM tip is brought into contact with a sample surface and then an AC modulation force is applied to the cantilever. The detector then measures the amount of AC deflection of the cantilever. On hard samples, the cantilever cannot indent into the surface, and no deflection is detected. On softer samples, the ultrasonic modulation force causes the tip to indent into the sample, resulting in a measurable AC deflection of the cantilever. Separate control over the DC force allows control over the tracking force that the AFM system uses to maintain contact between the tip and the surface.

The RF voltage can also be varied slowly to permit a quasistatic measurement to be performed. A quasistatic force imposition process is considered to be one in which, if the forces were to be removed at any stage during the process, the system would be in equilibrium from that time on. Hence, the RF voltage can be changed slowly enough to maintain equilibrium while the voltage is being altered. This procedure is in contrast to a dynamic (AC) measurement in which the RF signal is modulated at a high frequency and the system requires time to stabilize when force adjustment terminates. The cutoff between quasistatic and dynamic measurements is usually considered to be a frequency value below the cantilever's fundamental resonant frequency.

The relationship between cantilever deflection and drive voltage magnitude is proportional and can be used to obtain useful information concerning a sample. For instance, the RF signal generator 32 of FIG. 1 can be controlled to generate force curves. Force curves are often used to provide an indication of the magnitude of force required to obtain an effect such as indenting a sample surface, breaking the binding molecules between a sample and a probe in contact with the sample, etc. In order to generate a force curve with prior instruments, it was necessary to actuate a Z actuator in the scanhead to drive the probe against the sample (or move it away from the sample). The same effect can be obtained using an ultrasonic actuator simply by modulating the drive signal to an RF signal generator or other power source until the desired effect is achieved. The known proportional relationship between the signal drive voltage and cantilever deflection can then be used to calculate the force. No actuation of a separate Z actuator is required.

AFM cantilevers can also respond dynamically to radiation pressure, and those dynamic responses can be measured. Specifically, time harmonic forces can be generated by applying a sinusoidal amplitude modulation on the RF input signal. By choosing the modulation factor to be less than one, an appropriate biasing force can be applied to actuate the cantilever at the modulation frequency and its second harmonic. The deflection of the cantilever can then be recorded, e.g., by using a lock-in amplifier, which uses the modulation signal as its reference input and locks to the modulation frequency.

It has been discovered that an ultrasonic-actuator based system has a very wide bandwidth for exciting the cantilever. In practice, it is possible to modulate the RF signal up to about $\frac{1}{10}$ of the RF signal frequency or even higher. For a 300 MHz RF frequency, a cantilever actuation bandwidth of even 30 MHz is realizable. In fact, it is believed that the RF frequency from a low of 10 MHz or possibly even lower for air applications to 1 GHz or even higher for water applications with surface micromachined cantilevers for which attenuation may not be a problem. This cantilever actuation bandwidth is much greater than is provided by other AFM cantilever actuators, particularly acoustic and magnetic drives. An AFM having an ultrasonically driven cantilever can therefore be used to scan at rates that would have theretofore been considered unobtainable.

Figure 8:
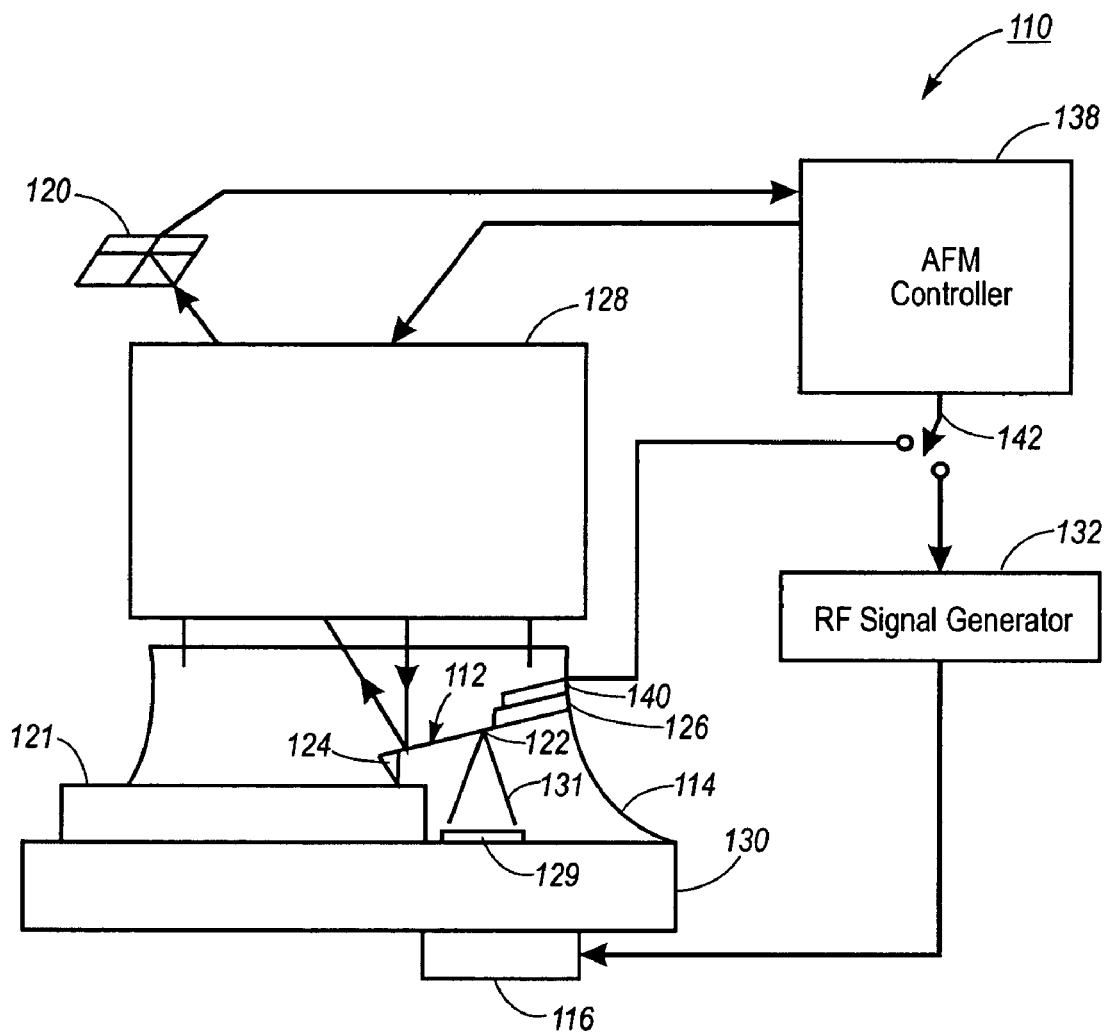
FIG. 8 schematically illustrates an acoustic ultrasonically actuated AFM constructed in accordance with a further embodiment of the application in which the AFM is configured for tapping mode operation.

An ultrasonic actuator of the type described above can be used to drive an AFM cantilever to oscillate at virtually any desired frequency significantly below the RF carrier frequency. An ultrasonic actuator therefore can be directly used as a tapping mode actuator in an AFM. A tapping mode AFM 110 using an ultrasonic actuator is shown schematically in FIG. 8. As with the more theoretical embodiment of FIG. 1, the instrument 110 includes a conventional probe 112, an ultrasonic actuator 116, and a detector 120. The probe 112 is configured to operate in a fluid cell 114 containing a sample 121. It includes a cantilever 122 having a base affixed to a support 126 and a free end bearing a tip 124. Also as in the embodiment of FIG. 1, an ultrasonically transmissive substrate 130 is placed below the cantilever 122. A cylindrical lens 129 such as a linear Fresnel lens is placed on or in the substrate 130. Use of cylindrical lens 129 will cause a beam 131 having control in a single dimension. The ultrasonic actuator 116 is mounted on the bottom of the substrate 130 and powered by an RF signal generator 132 under the control of an AFM controller 138. The RF signal generator 132 produces an RF oscillation in the ultrasonic actuator 116 and then modulates the amplitude of that signal in response to a tapping mode drive signal as supplied by the controller 138. The controller 138 may turn the drive signal on and off with a square wave, or it could modulate the amplitude of the drive signal in proportion to that sine wave. The controller 138 also drives an XYZ actuator in the scanhead 128 in the conventional manner.

The traditional tapping mode piezoelectric drive may be taken out of the loop and replaced by the ultrasonic actuator 116. In this case, the RF drive signal described in the preceding paragraph would always be used to drive the ultrasonic actuator 116. In the preferred embodiment however, a piezoelectric drive 140 can be retained, and a suitable switch 142 can be provided to permit a drive signal to be selectively transmitted to either modulate the output of RF signal generator 132 and hence activate the ultrasonic actuator, or the drive signal can be sent to the piezoelectric drive 140 directly from the AFM controller 138. For example, the resulting instrument could be operated in either air or liquid, with the piezoelectric drive 140 being used to effect operation in air and the ultrasonic actuator 116 being used to effect operation in liquid.

Figure 9:
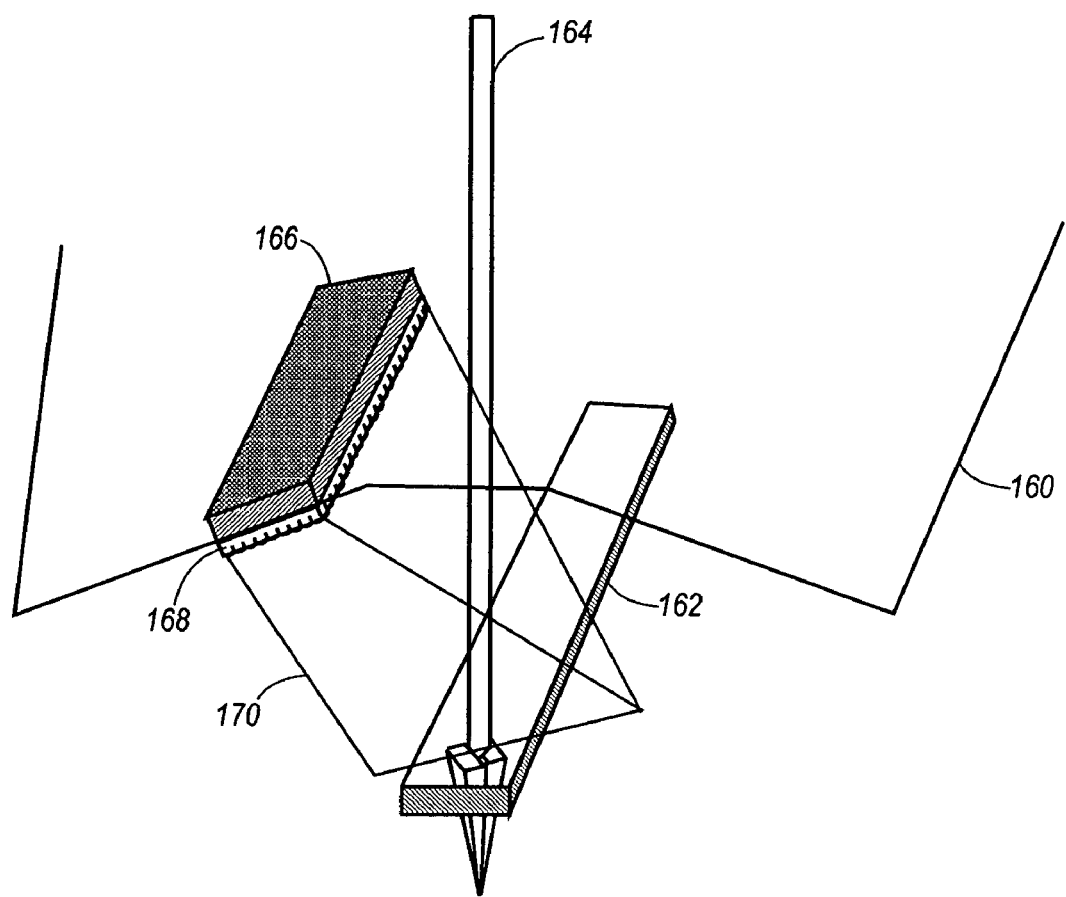
FIG. 9 is a schematic top view of the acoustic ultrasonic drive for an AFM constructed in accordance with yet a further embodiment of the invention in which the acoustic ultrasonic actuator and detector are positioned on a common side of the cantilever.

An issue of the instruments previously illustrated is that the sample is ultrasonically transmissive to permit unfettered transmission of the ultrasonic beam from the ultrasonic actuator, through the sample, and to the cantilever. A more versatile ultrasonic actuator assembly is schematically illustrated in FIG. 9. In this embodiment an ultrasonic actuator is mounted on a holder 160 positioned above the cantilever 162. The holder 160 is also positioned between the cantilever 162, on one hand, and a laser 164 and photodetector (not shown), on the other hand. The holder 160 may be constructed of glass or any other material that is transparent to light and transmissive to ultrasonic energy. In the illustrated embodiment, a ZnO transducer 166 is mounted on the holder 160. A cylindrical lens 168, such as a linear Fresnel lens, is formed in or mounted on the holder 160. The relevant portions of the holder are inclined to direct the corresponding ultrasonic beam 170 as a single dimension in the lateral direction of the longitudinal of the cantilever 160.

Figure 10:
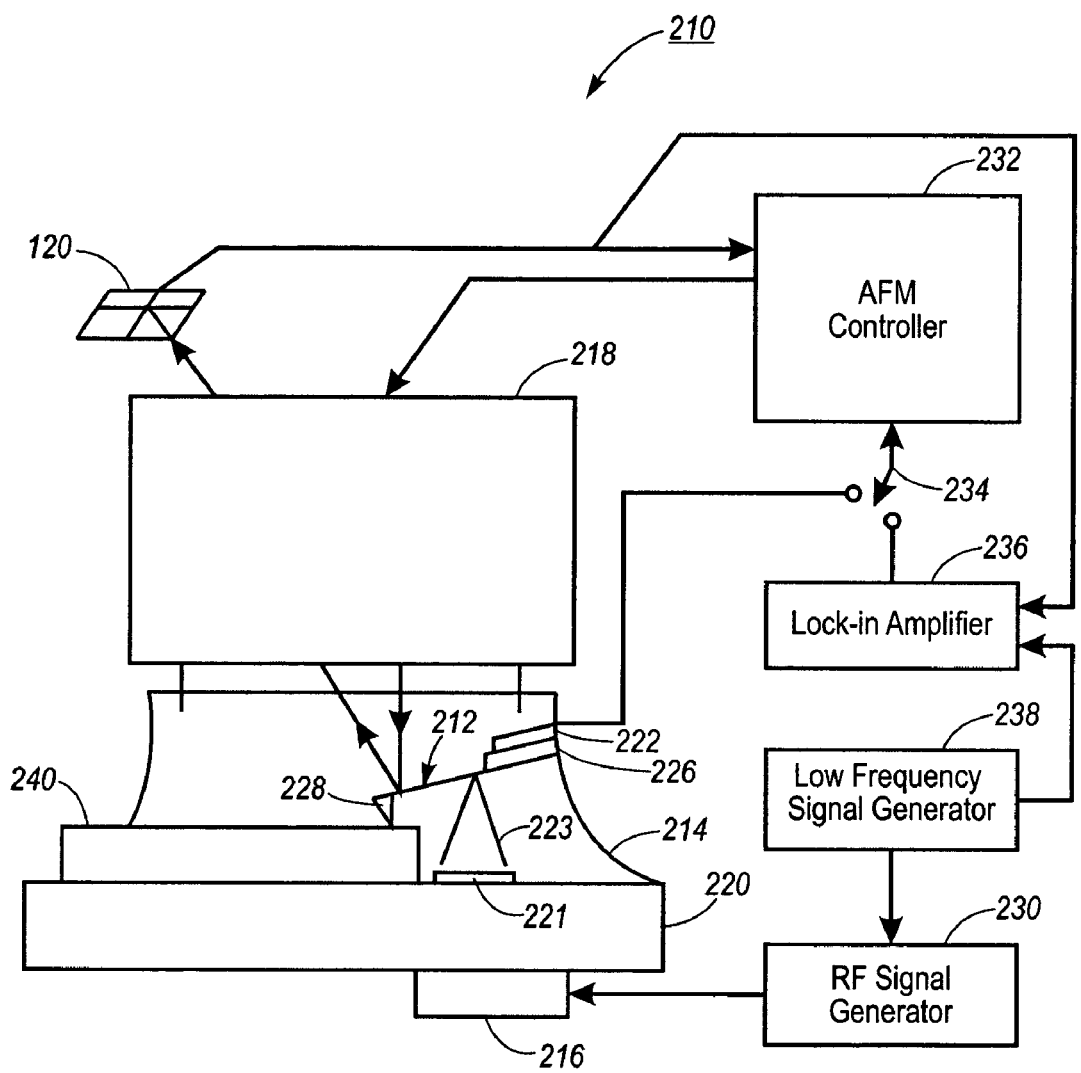
FIG. 10 schematically illustrates an acoustic ultrasonically actuated AFM constructed in accordance with a further embodiment of the invention in which the AFM is configured to take elasticity measurements.

An instrument 210 configured for elasticity characterization is illustrated in FIG. 10. It includes all of the components of the AFM of FIG. 8, including probe 212, a fluid cell 214, an ultrasonic transducer 216, a scanhead 218, a substrate 220 (with a cylindrical lens 22, built in or located on top thereof), and a piezoelectric drive 222. Use of cylindrical lens 221 causes wave 223 to be generated. The probe 212 includes a cantilever 224 that has a base mounted on a support 226 and that has a free end bearing a tip 228. Electronic components of the instrument 210 include an RF signal generator 230, an AFM controller 232, and a switch 234 selectively coupling the controller 232 to the RF signal generator and the piezoelectric drive 222. They additionally include a lock-in amplifier 236 and a low frequency signal generator 238. The lock-in amplifier 236 receives a feedback signal from the low frequency signal generator 238 and transmits an elasticity image signal to the AFM controller 232. Using conventional feedback to keep the force applied to the sample 240 constant, an image can be formed by monitoring cantilever deflection at the modulation frequency. The image, taking the form of an AC signal, has an amplitude and phase that both vary as a function of the sample stiffness. The procedure therefore can yield two simultaneous images: one for topography and one for surface elasticity. Elasticity characterizations using this technique can be performed much more rapidly than with prior known techniques due to the fact that the ultrasonic actuator has a dramatically higher bandwidth than prior systems that relied on a piezoelectric actuator to drive the entire probe up and down to obtain the required measurements. The prior systems typically had a maximum modulation frequency of only a few tens of kHz, whereas (as discussed above) an ultrasonic actuator based system has a cantilever actuation bandwidth of several MHz.

While the discussion has described the invention primarily incorporated into AFMs, it is to be understood the invention is not limited to the described embodiments or even to AFMs in general. Rather, it is applicable to virtually any probe-based instrument in which a cantilever is deflected by directing a focused beam of acoustic energy at the cantilever to apply ultrasonically generated acoustic radiation pressure to the cantilever. A variety of different ultrasonic acoustic actuators and associated drives may be applied to achieve these affects, and cantilever deflection may be measured using a variety of techniques. Also, while there is particular usefulness for use of cantilevers in fluid, such as water embodiments, other fluids may also take advantage of the present applications, including those in gases, the air or other non-water liquids as well as use in vacuums.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A probe-based instrument comprising:
a cantilever;
an acoustic actuator configured to direct a beam of acoustic energy at the cantilever so as to drive the cantilever; and
an RF excitation signal passed to the acoustic actuator to generate the beam of acoustic energy, the RF excitation signal being spread over a frequency spectrum to reduce resonance effects of the signal.

2. The probe based instrument of claim 1, wherein the RF excitation signal is generated by a signal generator.

3. The probe-based instrument according to claim 1 wherein the beam of acoustic energy is substantially a linearly focused beam.

4. The probe-based instrument according to claim 1, wherein the actuator includes a cylindrical lens, to generate the substantially linearly focused beam.

5. The probe-based instrument according to claim 1, wherein the beam is sized to extend over a width of the cantilever, and a distance from each cantilever edge sufficient to encompass the cantilever when the cantilever is misaligned.

6. The probe-based instrument according to claim 1, wherein the cantilever is a scanning probe microscope cantilever.

7. The probe-based instrument according to claim 1, wherein the cantilever is an atomic force microscope cantilever.

8. The probe-based instrument according to claim 1, wherein the cantilever is driven to oscillate at the resonant frequency of the cantilever or a harmonic thereof.

9. The probe-based instrument of claim 1, wherein the RF excitation signal spread over the frequency spectrum is a spread frequency oscillation signal and is comprised of RF voltage pulses, configured so that acoustic power perturbations generated by the RF pulses have resonances and anti-resonances which act to neutralize each other, to provide the diminishing of the undesirable resonance effects.

10. The probe-based instrument of claim 1, wherein the RF excitation signal spread over the frequency spectrum is a spread frequency oscillation signal generated by a signal generator and is formed by at least one of multifrequency RF tone bursts, an RF drive signal with increased frequency content generated by a mixer for mixing an RF carrier signal with a cyclical pseudo-random bit sequence signal, a linear chirp signal or modulated white noise.

11. The probe-based instrument according to claim 1, further configured as an Atomic Force Microscope (AFM), including an AFM tip.

12. The probe-based instrument according to claim 11, wherein the AFM is operated in a Force Modulation mode.

13. The probe-based instrument according to claim 11, wherein the AFM is operated in a tapping mode.

14. The probe-based instrument according to claim 1, wherein the frequency spectrum is from 10 MHz to 1 GHz.

15. The probe-based instrument according to claim 1, wherein the RF signal is modulated up to $1/10$ of the RF signal frequency.

16. The probe-based instrument according to claim 1, further configured to determine elasticity characterization.

17. The probe-based instrument according to claim 1, further configured at least partially within a liquid.

18. A method of moving a cantilever of a probe-based instrument comprising:
generating an RF excitation signal;
passing the RF excitation signal to an acoustic actuator; and
generating a beam of acoustic energy, from the RF signal, at the cantilever so as to drive the cantilever, wherein the RF excitation signal is spread over a frequency spectrum to reduce resonance effects of the signal.

19. A probe-based instrument comprising:
a cantilever;
an acoustic actuator configured to direct a beam of acoustic energy at the cantilever so as to drive the cantilever; and
an RF excitation signal passed to the acoustic actuator to generate the beam of acoustic energy, the RF excitation signal being spread over a frequency spectrum to drive the actuation so that acoustic power perturbations caused by resonances and anti-resonances of different frequencies from the acoustic actuator act to neutralize each other.

20. The probe-based instrument of claim 19, wherein the RF excitation signal is generated by a signal generator.

* * * * *